(12) United States Patent
Wondra et al.

(10) Patent No.: US 12,107,768 B2
(45) Date of Patent: *Oct. 1, 2024

(54) METHOD AND SYSTEM FOR DETERMINING A PATH MAXIMUM TRANSMISSION UNIT (MTU) BETWEEN ENDPOINTS OF A GENERIC ROUTING ENCAPSULATION (GRE) TUNNEL

(71) Applicant: CLOUDFLARE, INC., San Francisco, CA (US)

(72) Inventors: Nicholas Alexander Wondra, Savoy, IL (US); Erich Alfred Heine, Champaign, IL (US); Yan Zhai, Champaign, IL (US)

(73) Assignee: CLOUDFLARE, INC., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/333,297

(22) Filed: Jun. 12, 2023

(65) Prior Publication Data

US 2023/0328001 A1 Oct. 12, 2023

Related U.S. Application Data

(63) Continuation of application No. 17/509,983, filed on Oct. 25, 2021, now Pat. No. 11,677,675, which is a
(Continued)

(51) Int. Cl.
*H04L 47/36* (2022.01)
*H04L 12/46* (2006.01)

(52) U.S. Cl.
CPC .......... *H04L 47/36* (2013.01); *H04L 12/4633* (2013.01); *H04L 2212/00* (2013.01)

(58) Field of Classification Search
None
See application file for complete search history.

(56) References Cited

U.S. PATENT DOCUMENTS 7,801,021 B1 9/2010 Triantafillis et al.
9,923,835 B1 3/2018 Singh et al.

OTHER PUBLICATIONS

Basu, A., et al., "GRE Tunnel Keepalives," Cisco, Document ID: 118370, retrieved from the Internet: https://www.cisco.com/c/en/us/support/docs/ip/generic-routing-encapsulation-gre/118370-technote-gre-00.html, May 17, 2017, 11 pages.
(Continued)

*Primary Examiner* — Christine T Duong
(74) *Attorney, Agent, or Firm* — NICHOLSON DE VOS WEBSTER & ELLIOTT LLP (57) ABSTRACT

A method of path MTU determination in Generic Routing Encapsulation (GRE) tunnel is presented. A source network device (ND) transmits, to a destination ND that is a second endpoint of the GRE tunnel, a first outer packet including a first inner packet, where the first inner packet includes a first inner header that is used to deliver the first inner packet to the source network device, a first inner GRE header, and a first payload. The source ND receives the first inner packet. The source ND transmits a second outer packet including a second inner packet that includes a second payload that has a size greater than a size of the first payload. The source ND determines that the second inner packet is not received and determines a path MTU between the source ND and the destination ND based on a size of the first and the second outer packets.

18 Claims, 6 Drawing Sheets

Related U.S. Application Data continuation of application No. 16/992,922, filed on Aug. 13, 2020, now Pat. No. 11,159,437.

(60) Provisional application No. 62/886,304, filed on Aug. 13, 2019.

(56) References Cited

OTHER PUBLICATIONS

Majkowski M., "Path MTU Discovery in Practice," The Cloudflare Blog, retrieved from https://new.blog.cloudflare.com/path-mtu-discovery-in-practice/, Feb. 4, 2015, 11 pages.
Non-Final Office Action, U.S. Appl. No. 17/509,983, Dec. 5, 2022, 11 pages.
Notice of Allowance, U.S. Appl. No. 16/992,922, Jul. 30, 2021, 8 pages.
Notice of Allowance, U.S. Appl. No. 17/509,983, Mar. 15, 2023, 5 pages.
RFC 1701: Hanks, S., et al., "Generic Routing Encapsulation (GRE)," Network Working Group, Request for Comments: 1701, Oct. 1994, 8 pages.
RFC 2784: Farinacci D., et al., "Generic Routing Encapsulation (GRE)," Network Working Group, Request for Comments: 2784, retrieved from https://tools.ietf.org/html/rfc2784, Mar. 2000, 9 pages.
RFC 2890: Dommety G., "Key and Sequence Number Extensions to GRE," Network Working Group, Request for Comments: 2890, Sep. 2000, 7 pages.
RFC 4821: Mathis M., et al., "Packetization Layer Path MTU Discovery," The IETF Trust, Network Working Group, Request for Comments: 4821, Mar. 2007, 32 pages.

METHOD AND SYSTEM FOR DETERMINING A PATH MAXIMUM TRANSMISSION UNIT (MTU) BETWEEN ENDPOINTS OF A GENERIC ROUTING ENCAPSULATION (GRE) TUNNEL

CROSS-REFERENCE TO RELATED APPLICATIONS

This application is a continuation of U.S. application Ser. No. 17/509,983, filed Oct. 25, 2021, which is a continuation of U.S. application Ser. No. 16/992,922, filed Aug. 13, 2020, now U.S. Pat. No. 11,159,437, which claims the benefit of U.S. Provisional Application No. 62/886,304, filed Aug. 13, 2019, which is hereby incorporated by reference.

FIELD

Embodiments of the invention relate to the field of network computing; and more specifically, to the determination of the maximum transmission unit size on a network path between endpoints of generic routing encapsulation protocol.

BACKGROUND

In a packet-based network (such as Internet Protocol (IP) network), a source network device (ND) in the network needs to know how to divide the data into packets to transmit the data to a destination network device in the network. The maximum size of a packet a network device can communicate in a single network layer transaction is referred to as a Maximum Transmission Unit (MTU). The path in the network from the source network device to the destination network device can include one or more intermediary network devices (e.g., routers, middleboxes such as firewalls, network address translators, load balancers, etc.). Each intermediary network device on the network has a respective MTU. When the intermediary network device receives a packet that is larger than it respective MTU, it fragments the packet into multiple smaller packets. However, packet fragmentation is often undesirable. In typical network deployments, packet fragmentation on intermediary devices is either disabled (e.g., in IPv4, the packet fragment is disabled by setting a "Don't Fragment" bit in the IPv4 header) or is not supported (e.g., packet fragmentation is not supported in IPv6).

To avoid packet fragmentation, a network device needs to know the path MTU of the path between the source ND and the destination ND in the network. The path MTU represents the minimum MTU of the multiple network devices along the path from the source network device to the destination network device. The path MTU represents the maximum size of a packet that can be sent through the path in the network from the source ND to reach the destination ND.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for a determining a path maximum transmission unit (MTU) between endpoints of a generic routing encapsulation (GRE) tunnel are described.

Path MTU discovery mechanisms can be used to enable a source network device to discover the path MTU over the network to reach a destination network device. In existing path MTU discovery mechanisms, when a network device (e.g., an intermediary network device or the destination network device) receives a packet that is larger than its associated MTU and cannot fragment the packet, it drops the received packet and sends an Internet Control Message Protocol (ICMP) packet back to the source network device with an indicator of its associated MTU (which is referred to herein as ND MTU). Upon receipt of the ICMP packet, the source network device adjusts its maximum packet size to be lower than the MTU of the network device that caused the transmission of the ICMP packet. However, ICMP packets are not guaranteed to be delivered to the source network device. Intermediary network devices may drop the ICMP packets. For example, an intermediary network device may filter ICMP packets for perceived security reasons. This can lead to scenarios where a source network device may send packets that are too large for some network devices along the path and will never receive ICMP packets. These scenarios can be referred to as ICMP black hole in which packets are silently discarded without the source ND being informed that the packets did not reach their intended destination. The source network device is then not able to determine that it needs to lower the size of packets it is sending resulting in packet loss and unreliable delivery of data through the network.

In some path MTU discovery mechanisms, the source network device sends packets of varying sizes through the network and determines with the cooperation of an upper layer protocol (e.g., Transmission Control Protocol (TCP)) the path MTU for a path from the source ND to the destination ND. The upper layer protocol, such as a transport protocol, enables the detection of packet loss. The path MTU is determined according to the detected packet losses.

Generic Routing Encapsulation (GRE) is a type of tunneling protocol commonly used to deliver traffic across intermediary networks. A GRE tunnel can be established between a first network device and a second network device. The first and second network device can be referred to as GRE endpoints. The GRE tunnel is a virtual network or logical abstraction of a physical network that provides network services (e.g., L2 and/or L3 services). A virtual network can be implemented as an overlay network (sometimes referred to as a network virtualization overlay) that provides network services (e.g., layer 3 (L3, network layer)) services over an underlay network (e.g., an L2/L3 network, such as an Internet Protocol (IP) network that uses tunnels (e.g., GRE, etc.) to create the overlay network). The GRE tunnel is a logical path through which encapsulated packets are transmitted from the source network device to the destination network device. The source network device is configured such that when it receives IP packets that are destined to IP addresses of a local network coupled with the destination ND, the source ND wraps those IP packets in encapsulating IP headers plus a GRE header, where the encapsulated packet's destination IP address is the IP address of the destination ND. When the destination ND receives the encapsulated packet, it strips off the encapsulating IP header and GRE header and forwards the original IP packet into its local network. A similar procedure is followed for traffic from the destination ND to the source ND.

Performing path MTU discovery between endpoints of a GRE tunnel is challenging as the network devices terminating a GRE tunnel do not have access to packet loss detection mechanisms of upper layers such as the packetization layer (e.g., TCP). Further, given that ICMP packets are not guaranteed to be delivered (and are often filtered out by intermediary NDs in the network), the endpoints of the GRE tunnel cannot rely on path MTU mechanisms that are based on ICMP packets.

The embodiments described herein present mechanisms for reliable determination of a path MTU between endpoints of a GRE tunnel. The embodiments described herein do not rely on ICMP-based mechanism. The embodiments further operate without the need of operations from the higher layer protocols.

In one embodiment, a source ND transmits, to a destination network device, a first outer packet including a first inner packet. The first outer packet includes a first outer header that is used to transmit the first outer packet to the destination network device and a first outer GRE header, and the first inner packet includes a first inner header that is used to deliver the first inner packet to the source network device, a first inner GRE header, and a first payload. The source ND receives the first inner encapsulated packet. Responsive to receiving the first inner packet, the source ND sets a path maximum transmission unit (MTU) of a network path for traffic to reach the destination network device from the source network device to be equal or greater than a size of the first outer packet. The source ND transmits, to the destination network device, a second outer packet including a second inner packet. The second outer packet includes a second outer header that is used to transmit the second outer packet to the destination network device and a second outer GRE header, and the second inner encapsulated packet including a second inner header that is used to deliver the second inner packet to the source endpoint, a second inner GRE header, and a second payload that has a size that is different from a size of the first payload. Responsive to determining that the second inner packet is not received before a predetermined period of time has elapsed, the source ND sets the path MTU to be smaller than the size of the second outer encapsulated packet.

In some embodiments, the transmission of outer packets with varying sizes of payloads can be performed multiple times by the source network device until a more precise path MTU is set for the path between the source network device and the destination network device.

Figure 1:
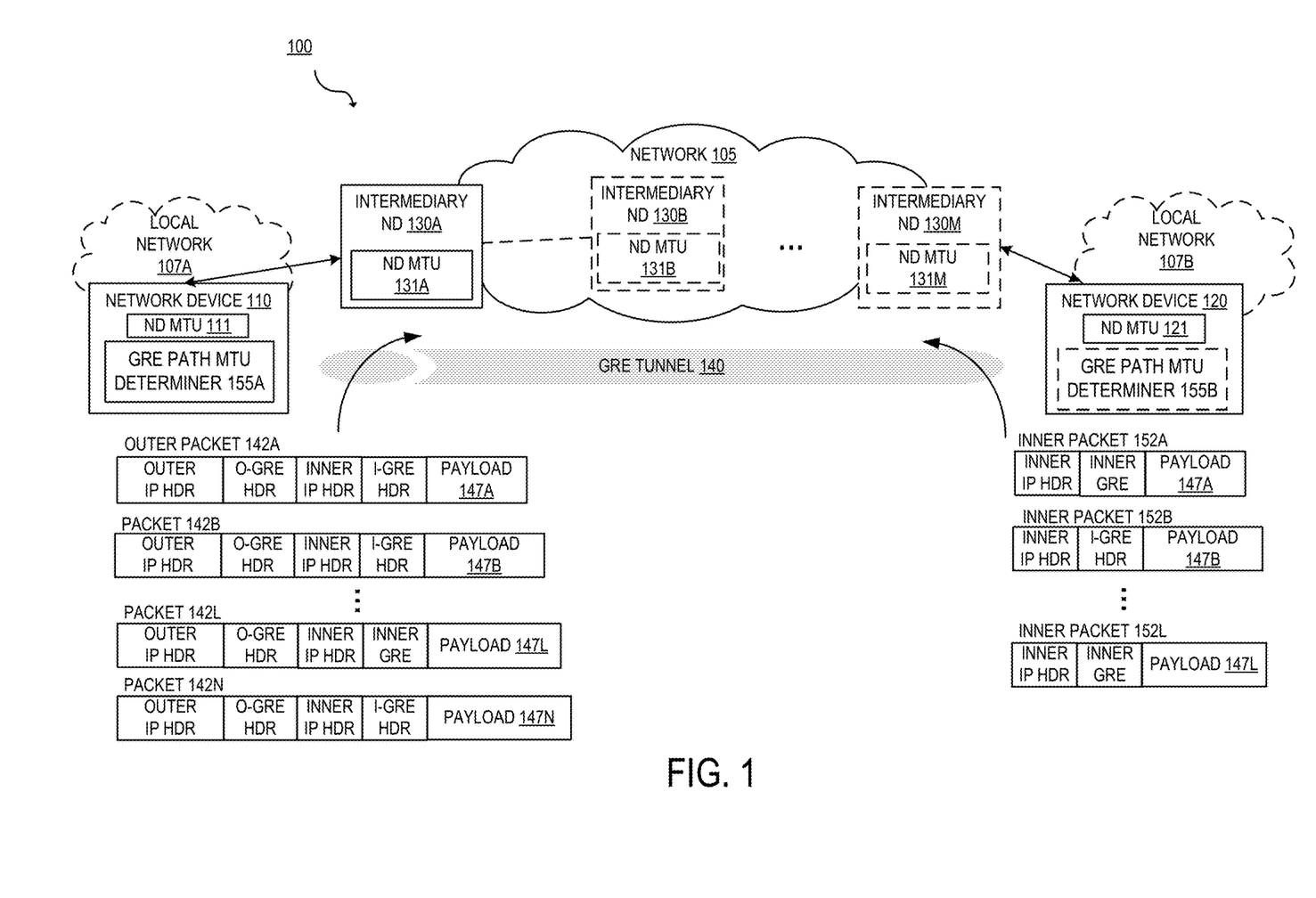
FIG. 1 illustrates a block diagram of an exemplary system that can be used to determine a path MTU between endpoints of a GRE tunnel, in accordance with some embodiments.

FIG. 1 illustrates a block diagram of an exemplary system 100 that can be used to determine a path MTU between endpoints of a GRE tunnel, in accordance with some embodiments. The system 100 includes a network device 110, network device 120, a network 105, and one or more intermediary network devices 130A-M.

Each one of the network devices ND 110, NDs 130A-M, and ND 120 is an electronic device that communicatively interconnects other electronic devices on the network (e.g., other network devices, end-user devices). Some of these network devices are "multiple services network devices" that provide support for multiple networking functions (e.g., routing, bridging, switching, Layer 2 aggregation, session border control, Quality of Service, and/or subscriber management), and/or provide support for multiple application services.

ND 110 and ND 120 are endpoints of a virtual network which can be referred to as a tunnel. In the example presented herein the tunnel is a GRE tunnel 140 such that each one of the tunnel endpoints, ND 110 and ND 120, are operative to transmit and receive packets according to the GRE protocol. According to the GRE protocol, a source ND encapsulates packets of data and transmits through the GRE tunnel the encapsulated packets to a destination ND. Encapsulation typically involves enclosing data (which is typically referred to as payload) in an additional header to form an encapsulated packet. The additional header provides routing information that enables the encapsulated packet to be forwarded in the network. The destination ND is operative to decapsulate the encapsulated packet. Decapsulation involves removing the additional header of the encapsulated packet to retrieve the payload.

The embodiments herein will be described with respect to the ND 110 acting as a source ND and will be referred to as the source ND 110, and with respect to the ND 120 acting as a destination ND, and which will be referred to herein as the destination ND 120. One of ordinary skill in the art would understand that when traffic is transmitted from ND 120 to ND 110, the ND 120 acts as a source ND and ND 110 acts as a destination ND.

In some embodiments, each one of ND 110 and ND 120 can be part of a respective local network. For example, ND 110 can be part of the local network 107A and ND 120 can be part of the local network 107B. Each one of the local networks 107A-B can include one or more additional network devices (such as host servers, routers, bridges, etc.) from which traffic can originate to be transmitted through the GRE tunnel 140. Further, the traffic received through the GRE tunnel 140 at each of ND 110 and ND 120 can be forwarded by the receiving GRE endpoint to a network device from its local network. ND 110 and ND 120 are coupled through a network 105. In some embodiments, the network 105 can be a wide area network (WAN) such as the Internet.

ND 110 transmits traffic to the ND 120 through the GRE tunnel 140 in the network 105. The traffic crosses one or more intermediary NDs such as ND 130A-M to reach the destination ND 120 through the network 105. The set of network devices ND 120, intermediary NDs 130A-M, and ND 120 form a path in the network 105. Each one of the NDs along the path has an associated node MTU (ND MTU): ND MTU 111, ND MTU 131A-M, and ND MTU 121. The node MTU represents the maximum size of a packet a network device can communicate in a single network layer transaction. For example, the MTU can be the size in bytes of the largest IP packet, including the IP header and payload, that can be forwarded by a network device. In another example, the MTU can be the size in bytes of the largest GRE packet that can be forwarded by a network device. When a network device receives a packet that has a size that is greater than its associated MTU, the packet is dropped. A path MTU for the path from ND 110 to ND 120 is determined based on the ND MTUs of each one of the network devices crossed along the path. The path MTU is the minimum MTU among the ND MTUs of the NDs in the path.

In the embodiments described herein, the endpoints of a network path are endpoints of a GRE tunnel, the determination of the path MTU is performed based on multiple outer GRE packets encapsulating inner GRE packets. ND 110 is operative to perform operations that enable the determination of a path MTU between two endpoints of a GRE tunnel. For example, the operations can be performed by the GRE path MTU determiner 155A. In some embodiments, the network device 120 may also include a GRE path MTU determiner 155B that can be used to determine the path MTU between the two GRE endpoints.

The ND 110 transmits multiple packets 142A-N of varying sizes to the destination ND 120 through the GRE tunnel 140. The packets 142A-N are GRE encapsulated packet, where each one respectively includes an inner packet from the inner packets 152A-N. The packets 142A-N have varying sizes of payloads. Each packet from the packets 142A-N has a different size than other payloads of other ones of the packets 142A-N. For example, the payload 147A has a different size than the size of the payload 147B and a different size than the size of the payload 147N. Depending on the size of the outer packet that is transmitted through the GRE tunnel 140, a network device from the path may forward the packet, when the size of the packet is smaller or equal to the MTU of the network device, or may drop the packet, when the size of the packet is greater than the MTU of the network device. Therefore, ND 120 receives the packets which have a size that is smaller than or equal to the node MTU of any one of the intermediary network devices along the path in the GRE tunnel 140. The ND 120 does not receive the packets that have a size greater than the node MTU of the network devices along the path. Further, upon receipt of an outer packet, the ND 120 determines whether the inner packet can be processed by determining whether the size of the outer packet is smaller than or equal to the node MTU of ND 120. Upon determination that the size of the outer packet is smaller than or equal to the node MTU of ND 120, the outer packet is processed by ND 120.

Upon receipt of a packet (e.g., packet 142A), the ND 120 decapsulates the packet according to the GRE protocol and retrieves an inner packet 152A. Similarly to the initial packet 142A, the inner packet 152A is a GRE encapsulated packet. The inner packet 152A is configured to be transmitted from the ND 120 to the ND 110 through the GRE tunnel 140. Following the decapsulation of the packet 142A, ND 120 forwards the packet 152A to the ND 110. Given that the size of the inner packet 152A is smaller than the size of the packet 142A, the packet 152A is likely to be received by ND 110 as its size is smaller than the MTU of each one of the network devices in the GRE tunnel 140.

The ND 110 is operative to determine based on the multiple GRE packets transmitted to the ND 120 and based on the inner packets received from the ND 120, a path MTU for the path along the GRE tunnel 140 as it will be described in further details below.

Figure 2:
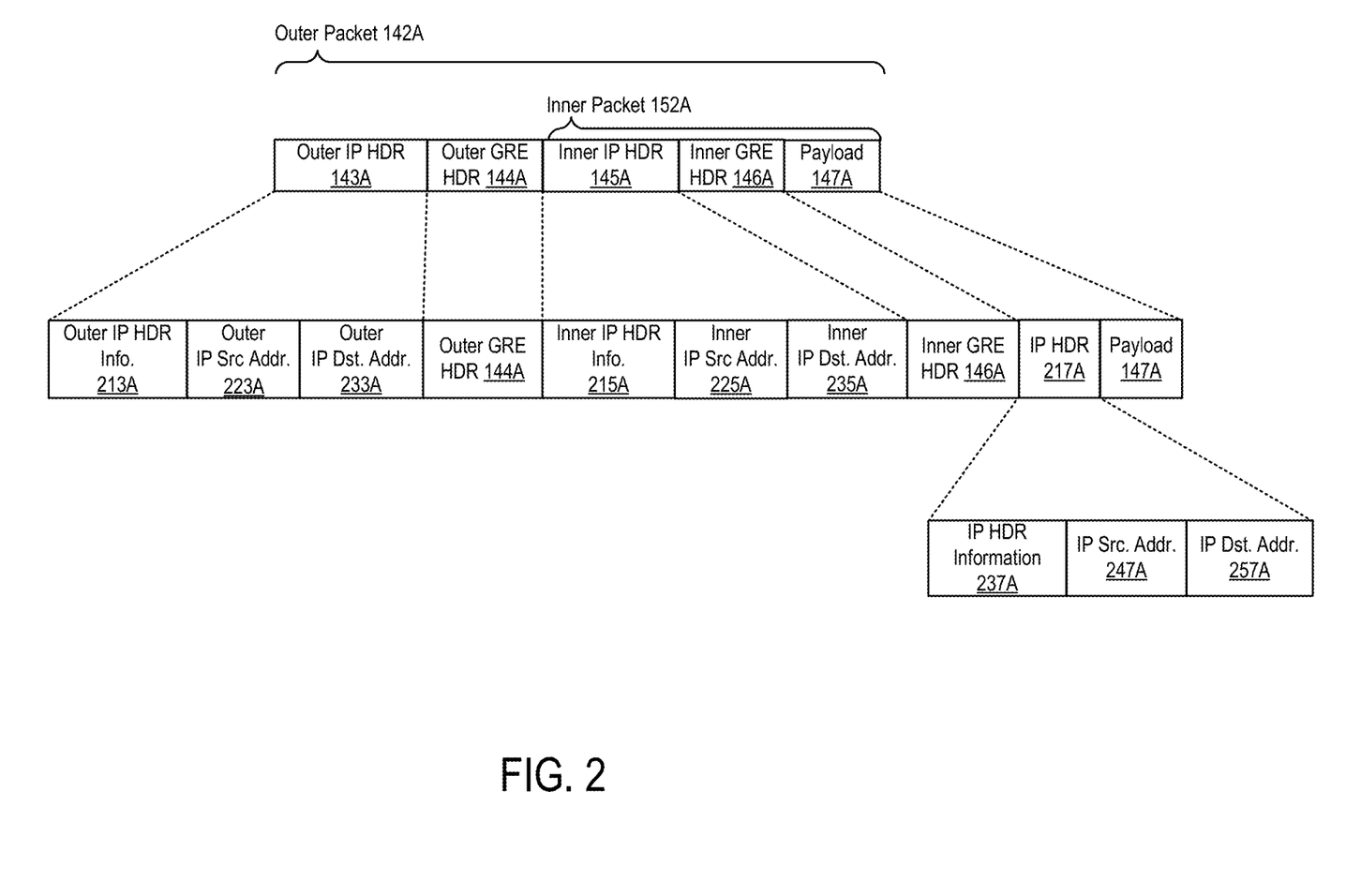
FIG. 2 illustrates an exemplary outer packet that is transmitted from a source network device to a destination network device for determination of a path MTU in a GRE tunnel, in accordance with some embodiments.

FIG. 2 illustrates an exemplary outer packet that is transmitted from a source network device to a destination network device for determination of a path MTU in a GRE tunnel, in accordance with some embodiments. In the following description outer packets and probe packet can interchangeably be used. The outer packet 142A is an example of probe packet that can be used during a probing process for determining an effective path MTU between a first GRE endpoint and a second GRE endpoint in a network. While the illustrated example shows an exemplary format of the packet 142A, which can be the initial packet transmitted from the source ND 110 to the destination ND 120, one of ordinary skill in the art will understand that the subsequent packets (e.g., 142B-N) are also generated by the ND 110 according to a similar format.

The packet 142A is encapsulated according to the GRE protocol. Packet 142A includes an outer IP header (outer IP HDR) 143A and an outer GRE header 144A. The outer packet 142A includes an inner packet 152A. The inner packet 152A includes an inner IP header (inner IP HDR) 145A, an inner GRE header (inner GRE HDR) 146A and a payload 147A.

The outer IP header 143A is used to deliver the packet 142A from the source ND 110 (the first endpoint of the GRE tunnel 140) through the GRE tunnel 140 to the destination network device 120 (the second endpoint of the GRE tunnel 140). The outer IP HDR 143A includes outer IP header information (Outer IP HDR Info.) 213A, outer IP source address (Outer IP Src. Addr.) 223A, and IP destination address (IP Dst. Addr.) 233A. The outer IP source address 223A includes the IP address of the source ND 110. The IP destination address 233A includes the IP address of the destination ND 120. The inner packet 152A comprises an inner IP header (inner IP HDR) 145A and an inner GRE header (inner GRE HDR) 146A. The inner IP header 145A is used to deliver the inner packet 152A, through the GRE tunnel 140, from the destination ND 120 to the source ND 110. The inner IP header 145A includes IP header information (Inner IP HDR Info.) 215A, inner IP source address (Inner IP Src. Addr.) 225A and inner IP destination address (Inner IP Dst. Addr.) 235A. The inner IP source address 225A includes the IP address of the destination ND 120. The inner IP destination address 235A includes the IP address of the source ND 110. The inner packet 152A further includes the payload 147A. The payload 147A is generated by the ND 110. The payload 147A can include dummy data (e.g., all bits 0s, all bits 1s, mix between 0s and 1s), and/or other information such as timestamps that can be used to measure network round-trip time in addition to the path MTU). The packet 142A is transmitted independently from the actual traffic between ND 110 and ND 120. While in the illustrated example, the delivery headers are IP headers (e.g., outer IP header 143A and inner IP header 145A), in other embodiments, the delivery headers can be set based on a corresponding delivery protocol when the delivery protocol is different from the IP protocol. While in the illustrated example, the delivery headers are IP headers (e.g., Outer IP header 143A and inner IP header 145A), in other embodiments, the delivery headers can be set based on a corresponding delivery protocol when the delivery protocol is different from the IP protocol.

The outer packet 142A is transmitted from the source ND 110 to the destination ND 120. When the destination ND 120 receives the packet 142A, it is operative to decapsulate the packet 142A to retrieve the inner packet 152A and to transmit, based on the GRE protocol, the inner packet 152A back to the source ND 110. In some embodiments, prior to decapsulating the packet 142A, the ND 120 determines that the size of the packet is smaller than or equal to the ND's MTU. A similar process is performed for each one of the multiple packets 142B-N that are transmitted from ND 110 to ND 120. The inner packets 152A-L are transmitted from ND 120 to ND 110, through the GRE tunnel 140, when their corresponding encapsulated packets 142A-L are received by the ND 120 and their size is smaller than or equal to the MTU 121 of ND 120. When a packet from the packets 142A-L is received by the destination ND 120, it is an indication that the size of the packet is smaller or equal to the ND MTU of each ND that is in the path between the source ND 110 and the destination ND 120.

Figure 3A:
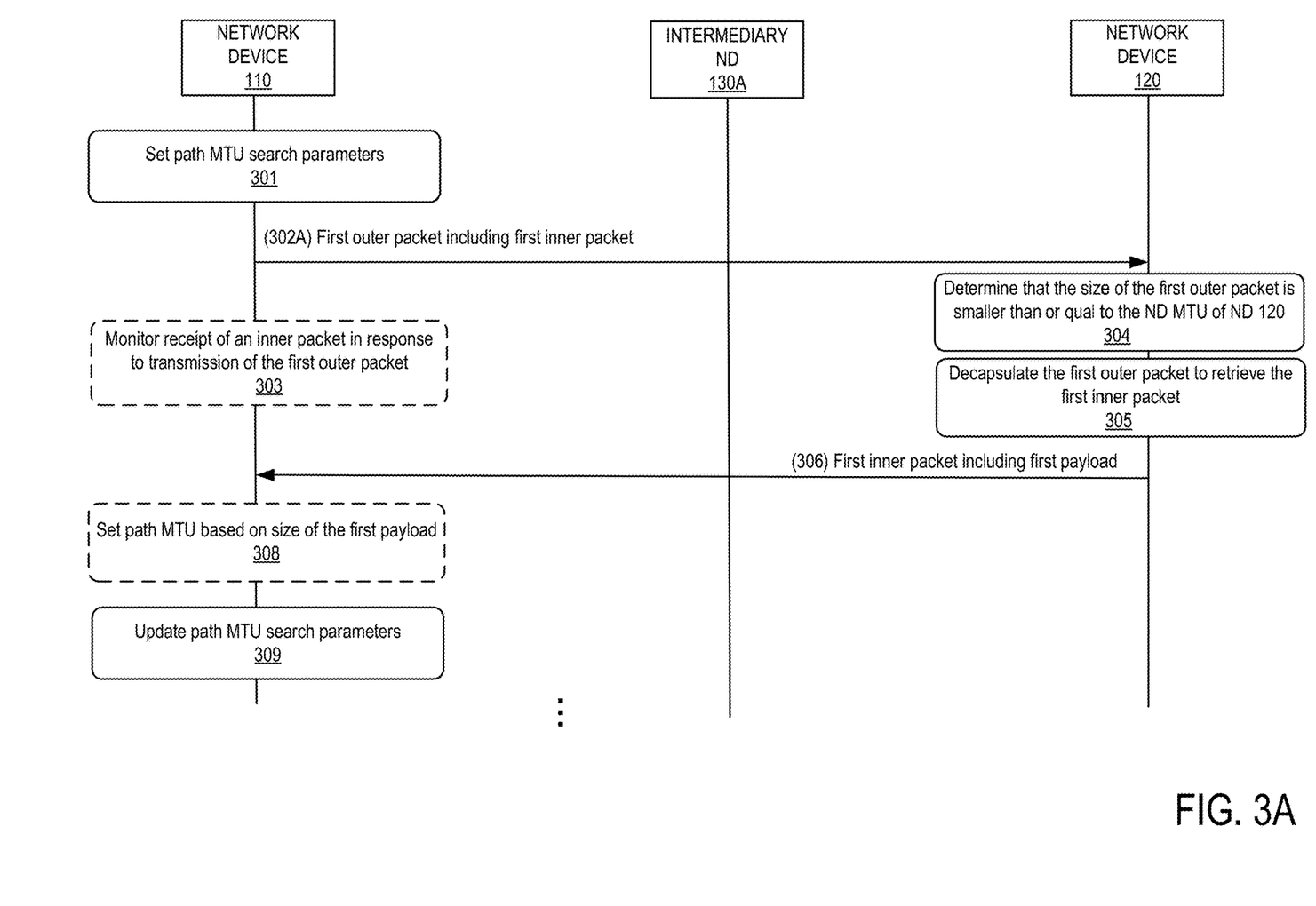
FIG. 3A illustrates a block diagram of operations that can be performed when a first outer packet is transmitted from an endpoint to the other endpoint of a GRE tunnel, in accordance with some embodiments.

FIG. 3A illustrates a block diagram of operations that can be performed when a first outer packet is transmitted from a first endpoint to a second endpoint of a GRE tunnel, in accordance with some embodiments. The embodiments described herein are performed between the source network device 110 and the destination network device 120. Each one of the source ND 110 and the destination ND 120 are endpoints of the GRE tunnel 140. The source ND 110 is operative to transmit multiple probe packets of different sizes to determine the effective path MTU of a path between the source ND 110 and the destination ND 120. The probe packets are transmitted by the source ND 110 separately from the regular traffic. For example, the source ND 110 can delay transmission of regular traffic to the destination ND 120 until determination of the path MTU for the path between ND 110 and ND 120 is complete. While the operations herein will be described with respect to the source ND 110, similar operations can be performed by the destination network device to allow the destination network device 120 to set a path MTU for the path between the source ND 110 and the destination ND 120.

At operation 301, the source ND sets the path MTU search parameters. In some embodiments, the path MTU search parameters include a lower limit of a path MTU search window. The path MTU search window is an interval of potential sizes from which an effective path MTU can be selected for a path between a source ND and a destination ND. The lower limit of the path MTU search window indicates the smallest size of a probe packet that can be transmitted by the ND 110. The network path from ND 110 to ND 120 is expected to be able to deliver packets of a size equal to the lower limit. The lower limit of the path MTU search interval can be used as a size of an initial probe packet when the path MTU probing mechanisms is started.

In some embodiments, the path MTU search parameters may further include a higher limit of the path MTU search window. The higher limit of the path MTU search window indicates the greatest useful probe size. Packets of a size equal to or greater than the higher limit are expected to be too large to be delivered to the ND 120 through the network path. In some embodiments, the higher limit of the path MTU may not be known when the probing mechanism is started. In other embodiments, the higher limit can be set to an initial value. The probing mechanism is operative to determine or update the higher limit.

In some embodiments, the path MTU parameters may include a next probe value that can be used to determine the size of the next probe packet to be transmitted. For example, the next probe value can be determined by increasing the size of the previously transmitted probe packet by a fixed predetermined value (+1 byte, +2 bytes, etc.). In another example, the next probe value can be determined based on a binary search algorithm that determines the size of the next probe packet based on the higher limit and the lower limit of the search window. For example, the next probe value can equal the halfway point between the lower limit and the higher limit. Other search mechanisms can be used to determine the next probe value without departing from the scope of the present embodiments.

In some embodiments, at operation 301, setting the path MTU search parameters includes setting an initial value for the lower limit and a mechanism for determining the next probe value. In other embodiments, at operation 301, setting the path MTU search parameters includes setting an initial value for the lower limit, a mechanism for determining the next probe value, and an initial value for the higher limit of the search window. In some embodiments, an initial value for the lower limit of the path MTU search window is configurable. The initial value of the lower limit can be set to an MTU size that is likely to work over a wide range of environments. For example, a value of 1024 bytes can be used as an initial value for the lower limit of the path MTU search window. An initial value selected for the higher limit can be the largest possible packet that might be supported by the flow. For example, the initial value of the higher limit can be limited by a local interface MTU of the ND 110, by an explicit protocol mechanism that specifies the largest amount of data that a network device can receive in a single payload (such as the TCP Maximum Segment Size (MSS), or by an intrinsic limit such as the size of a length field, etc.). In addition, the initial value selected for the higher limit may be limited by an administrator of the system 100 to prevent probing above some maximum size.

In some embodiments, in addition to setting path MTU search parameters, the ND 110 is operative to set an initial path MTU. In some embodiments, during the probing process (i.e., transmission of probe packets to determine the effective MTU of a path between the source ND 110 and the destination ND 120), an initial path MTU can be set and used for transmission of regular traffic. In some embodiments, the size of a probe packet that is to be transmitted is different than the initial path MTU. In some embodiments, the size of the probe packet can be the same as the initial path MTU.

At operation 302A, the source ND 110 transmits, towards the destination network device 120, a first outer packet including a first inner packet. For example, the first outer packet is packet 142A including first inner packet 152A. The first outer packet includes a first outer header that is used to transmit the first outer packet to the destination network device, a first outer GRE header, and the first inner packet. The first inner packet 152A includes a first inner header that is used to deliver the first inner packet to the source network device, a first inner GRE header, and a first payload.

In some embodiments, the first payload is selected such that its size is an initial size. For example, the size of the first payload can be set based on the lower limit of the search window. In an initial step, the size of the first payload can be set such that the size of the outer packet equals the lower limit. In another example, the size of the first payload can be determined based on the lower limit and the higher limit of the search window depending on the search algorithm selected. The size of the first payload can be set such that the outer packet 142A has a size that is halfway between the lower limit and the higher limit of the search window. The first payload is generated by the source ND 110. The first payload can include dummy data (e.g., all bits 0s, all bits 1s, mix between 0s and 1s), and/or other information such as timestamps that can be used to measure network round-trip time.

At operation 303, the source ND 110 monitors receipt of the first inner packet 152A in response to the transmission of the first outer packet 142A. For example, the source ND 110 may start a timer that records the time elapsed since the transmission of the first outer packet 142A and monitor whether the timer expires or not. Further, ND 110 may determine whether the inner packet 152A is received before the predetermined period of time has elapsed (i.e., before the expiration of the timer or timeout).

At operation 304, the destination ND 120 determines whether the size of the first outer packet 142A received from the ND 110, is smaller than or equal to the ND MTU 121 of the ND 120. In response to determining that the size of the first outer packet 142A is smaller than or equal to the ND MTU 121 of the ND 120, the ND 120 decapsulates, at operation 305, the first outer packet to retrieve the first inner packet 152A. The inner packet 152A is processed according to the GRE protocol and, at operation 306, ND 120 transmits the inner packet 152A.

The source ND 110 receives the inner packet 152A. The receipt of the inner packet 152A is an indication that the size of the packet 142A is smaller than or equal to the ND MTU of each one of the network devices that are crossed along the path in the network between the source ND 110 and the destination ND 120. As this path may include one or more intermediary network devices 130A-M, each one of these intermediary NDs determines, upon receipt of the first outer packet 142A, how its size compares with the ND's node MTU. When the size of the outer packet is smaller than or equal to the ND MTU, the associated ND forwards the outer packet 142A to the next hop towards the destination ND 120. The outer packet 142A is then received by the destination ND 120.

In response to the receipt of the first inner packet, the source ND may set, at operation 308, a path MTU of the network path between the source network device to the destination network device to be equal to or greater than a size of the first outer packet. At operation 309, the ND 110 updates the path MTU search parameters. In some embodiments, the ND 110 may update the search parameters without updating the value of the path MTU.

In some embodiments, the source network device may transmit additional probe packets towards the destination network device to obtain a more precise path MTU based on the updated search parameters. In some embodiments, an additional probe packet may be transmitted upon determination that probing conditions are satisfied. The determining that the probing conditions are satisfied may include the determination that there is no unresolved probing as a result of the transmission of a previous probe packet. For example, packet 142B may not be transmitted if it is determined that inner packet 152A has not been received and that the timer associated with this packet has not yet expired. The determination that the probing condition are satisfied may further include determining that the probing window available is greater than the size of the outer packet to be sent as a probe. The probing window is determined by the low and high limits, which are updated as the probing packets are transmitted. When it is determined that a new probing packet (e.g., outer packet 142B) is greater in size than the available window (i.e., greater in size than the high limit), then a new probing packet may not be transmitted. In some embodiments, when the conditions are satisfied, the ND 110 is operative to generate a new probe packet (e.g., 142B, 142C, . . . , 142N) to be transmitted to the ND 120. The new probe packet is generated based on the updated path MTU search parameters. For example, the new probe packet can be determined based on an updated lower limit (which is increased to equal the size of the previous probe packet 142A) and the higher limit of the search window. The operations of FIG. 3A can be repeated multiple times for multiple probe packets (e.g., packets 142B-L) until a packet that is greater than the path MTU is generated (e.g., packet 142N).

Figure 3B:
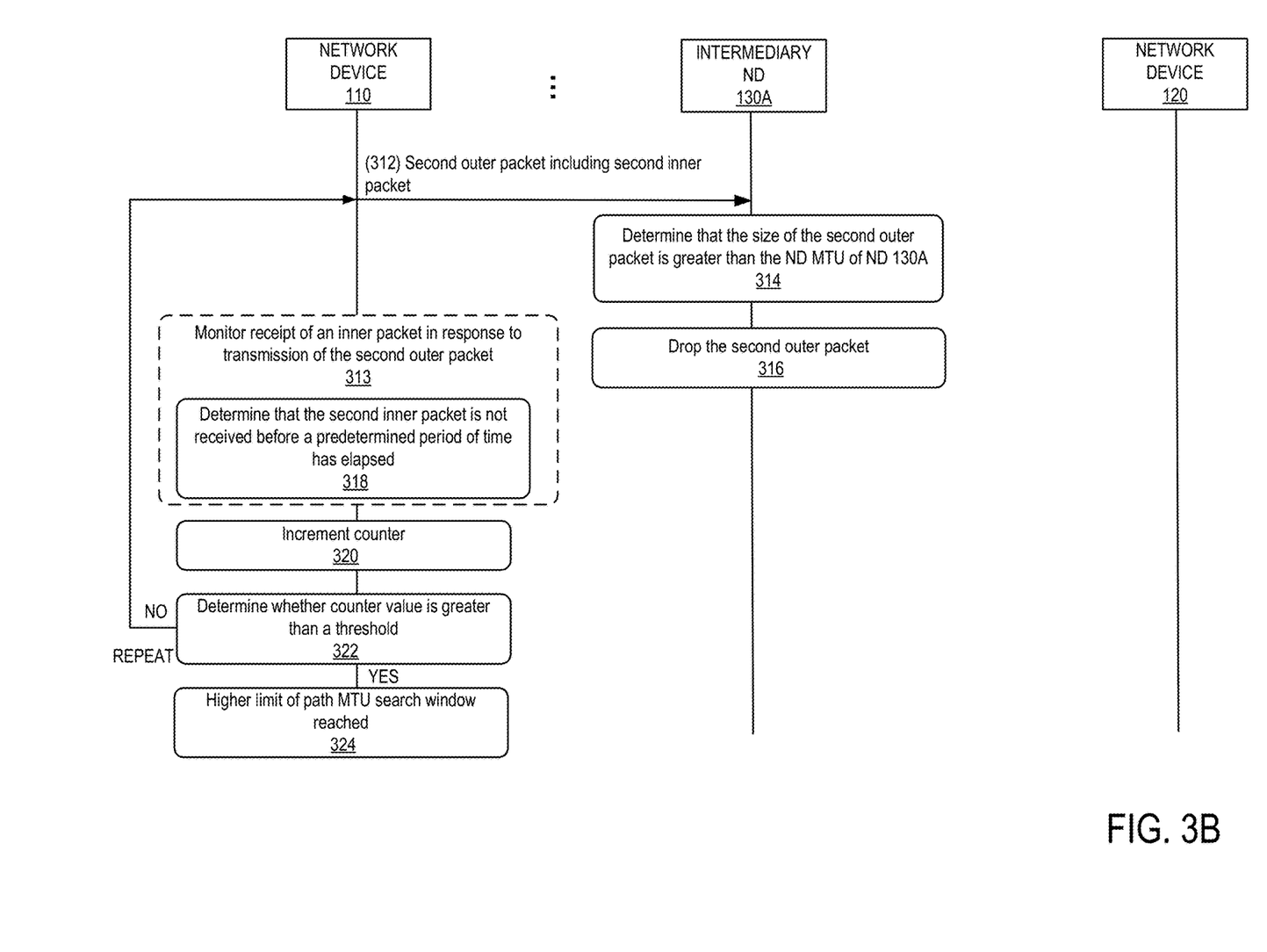
FIG. 3B illustrates a block diagram of exemplary operations performed when a second outer packet is transmitted, in accordance with some embodiments.

FIG. 3B illustrates a block diagram of exemplary operations performed when a second outer packet is transmitted, in accordance with some embodiments. The updated path MTU search parameters cause the update of the size of the new outer packet to be generated. The updated path MTU search parameters indicate the size of the next probe and provide an indication of the size of the payload that is to be included in the new outer packet. In some embodiments, the updated payload has a size that is greater than the size of the first payload 147A transmitted as part of the first outer packet 142A. For example, the updated payload can be payload 147N of the second outer packet 142N. Upon determination of a second payload and generation of the second outer packet 142B. The source ND 110 transmits, to the destination network device 120, the second outer packet 142N including a second inner packet 152B. The second outer packet 142N includes a second outer header that is used to transmit the second outer packet to the destination network device, a second outer GRE header, and the second inner packet 152N. The second inner packet 152N includes a second inner header that is used to deliver the second inner packet to the source network device, a second inner GRE header, and the second payload. The second payload 147N has a size that is different from a size of the first payload. In one example, the size of the second payload 147N is greater than the size of the first payload 147A resulting in the second outer packet 142N having a size that is greater than the size of the first outer packet 142A.

The second outer packet 142B is transmitted, at operation 312, towards the ND 120 through the GRE tunnel 140 based on the outer header. At operation 313, the ND 110 monitors receipt of an inner packet in response to the transmission of the second outer packet. The second outer packet 142N crosses one or more intermediary network devices such as intermediary ND 130A. In one example, the size of the second outer packet 142N is greater than the ND MTU of ND 130A. Upon receipt of the second outer packet 142N, the intermediary ND 130A determines, at operation 314, that the size of the second outer packet is greater that its associated ND MTU 131A. As a result of this determination, the intermediary ND 130A drops, at operation 316, the second outer packet 142N. While the example illustrated herein shows that the packet is dropped at intermediary ND 130A, this may occur at any one of the intermediary NDs 130B-N or at the destination ND 120 when it is determined that the size of the second outer packet 142N is greater than their respective ND MTU. As the second outer packet is dropped, the intermediary ND 130A does not process the packet and does not transmit the packet towards the ND 120. The ND 120 does process the outer packet 142N and does not transmit the inner packet 152N to the source ND 110. The source ND 110 does not receive the second inner packet 152B in response to the transmission of the second outer packet 142N.

At operation 318, the ND 120 determines that the time period has elapsed without receipt of an inner packet for the transmitted packet 142N. For example, the determination that the inner packet is not received is performed as a result of expiration of the timer started upon transmission of the outer packet 142N from the ND 110. Responsive to determining that the inner packet is not received before the predetermined period of time has elapsed, the flow of operations moves to operation 320. At operation 320, the ND 110 increments a counter associated with the path from the source ND 110 to the destination ND 120. The flow of operations moves to operation 322, at which the ND 110 determines whether the counter value is greater than a predetermined threshold.

When it is determined that the value of the counter is not greater than the predetermined threshold, the ND 110 repeats operation 312 and 320. The operations are repeated based on the same outer packet 142N. The same outer packet 142N is retransmitted until it is determined that the value of the counter is greater than the threshold or the receipt of the inner packet 152N. When the inner packet is not received back by the ND 110 as a result of its size being greater than the ND MTU of a network device along the path, it is likely that all successive transmissions of the packet will have the same result consequently increasing the value of the counter. When the counter value is greater than the predetermined threshold, it is an indication that a number of packets of the same size (e.g., size of packet 142N) have been successively transmitted by the ND 110 without receipt of their corresponding inner packets.

Following the increase of the counter value several times until the value of the counter reaches the threshold, the flow of operations move to operation 324. At operation 324, the network device 110 determines that the higher limit of the path MTU search window has been reached. When the higher limit of the search window is reached, it is an indication that the size of the packet 142N is greater than an effective path MTU of the path from the network device 110 to the network device 120 and that the path MTU at the ND 110 should be set to be smaller than the size of the packet 142N. In some embodiments, when the higher limit of the path MTU search window is reached, the probing process may stop. In these embodiments, the path MTU has previously been set to the last size of probe packets that successfully crossed the network and returned an inner packet. In other embodiments, when the size of the last successful probe packets is stored without updating the path MTU during the probing process, the path MTU of the ND 110 is updated to the size of the last successfully sent probe packet. For example, the path MTU can be set to the size of the outer packet 142L, which is successfully processed (i.e., its inner packet 152L is received back from the ND 120).

In some embodiments, the probing process can be repeated periodically to determine whether the path MTU for the path between the endpoints of the GRE tunnel 140 has changed. For example, the mechanisms of FIG. 3A-B can be repeated based on updated initial search parameters to determine whether the path MTU has increased or decreased. In some embodiments, the size of the initial probe packet can be set to the path MTU determined at the previous iteration of the probing process.

The operations described herein allow for a determination of a path MTU in a GRE tunnel without the need of an acknowledgment structure of a transport protocol or an application level protocol that delivers accurate and timely indication of packet losses to the sender. Instead, the mechanisms described herein provide an improved path MTU discovery that relies on GRE feedback packets (inner packets) that are used as an indication of receipt of packets or alternatively of loss of packets in a GRE tunnel.

Figure 4:
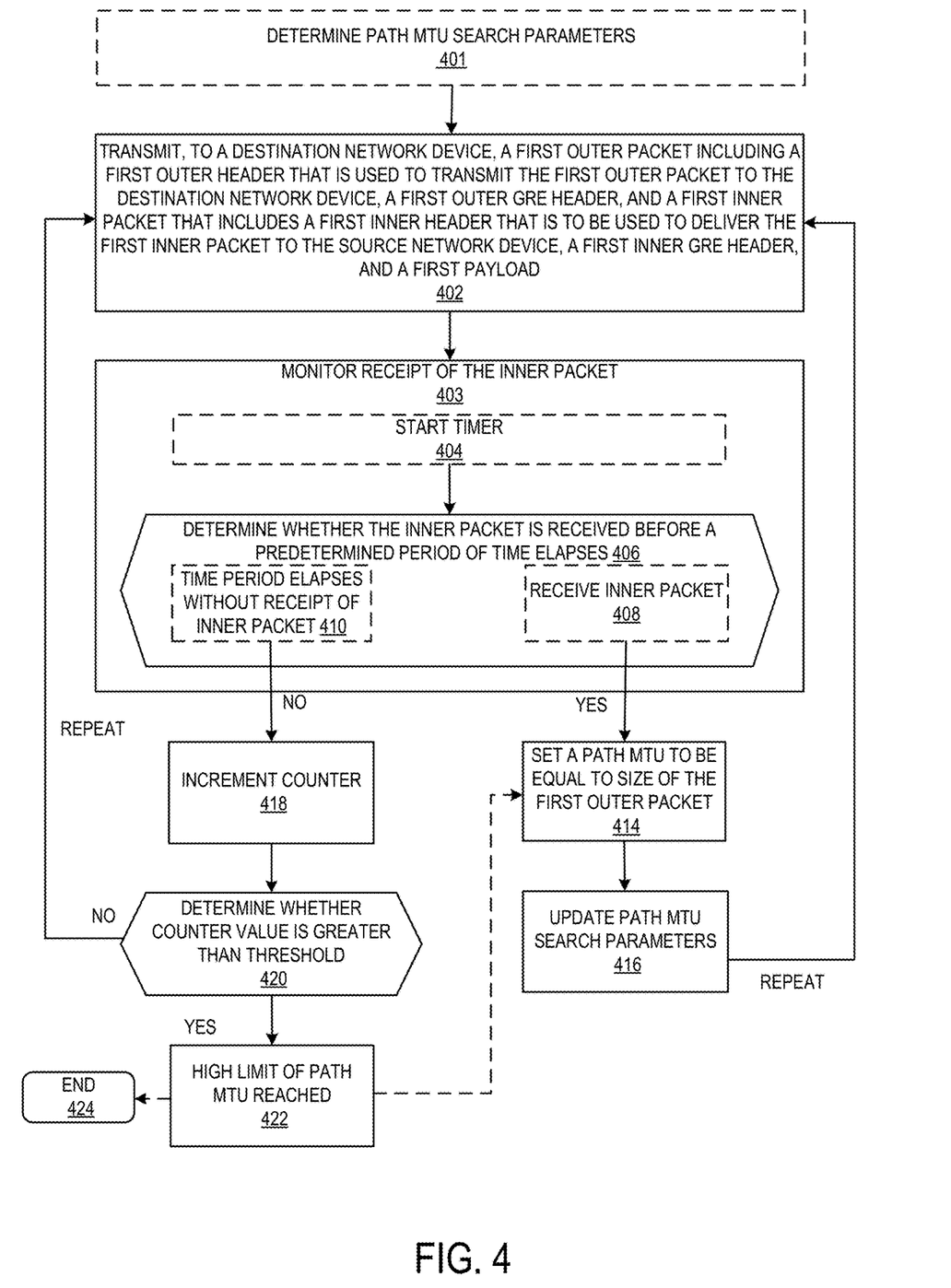
FIG. 4 illustrates a flow diagram of exemplary operations that can be performed to determine the path MTU between two GRE endpoints in a network, in accordance with some embodiments.

FIG. 4 illustrates a flow diagram of exemplary operations that can be performed to determine the path MTU between two GRE endpoints in a network, in accordance with some embodiments. The operations of FIG. 4 are described with respect to the exemplary embodiment of FIGS. 1 and 2. However, the operations of FIG. 4 can be performed by different embodiments than those of FIGS. 1 and 2, and the embodiment described in FIGS. 1 and 2 can perform operations different than those of FIG. 4. While the operations herein will be described with respect to the source ND 110, similar operations can be performed by the destination network device to allow the destination network device 120 to set a path MTU for the path between the source ND 110 and the destination ND 120.

The probe packets are transmitted by the source ND 110 separately from the regular traffic. For example, the source ND 110 can delay transmission of regular traffic to the destination ND 120 until determination of the path MTU for the path between ND 110 and ND 120 is complete.

At operation 401, the source ND sets the path MTU search parameters. In some embodiments, the path MTU search parameters include a lower limit of a path MTU search window. The path MTU search window is an interval of potential sizes from which an effective path MTU can be selected for a path between a source ND and a destination ND. The lower limit of the path MTU search window indicates the smallest size of a probe packet that can be transmitted by the ND 110. The network path from ND 110 to ND 120 is expected to be able to deliver packets of a size equal to the lower limit. The lower limit of the path MTU search interval can be used as a size of an initial probe packet when the path MTU probing mechanisms is started.

In some embodiments, the path MTU search parameters may further include a higher limit of the path MTU search window. The higher limit of the path MTU search window indicates the greatest useful probe size. Packets of a size equal to or greater than the higher limit are expected to be too large to be delivered to the ND 120 through the network path. In some embodiments, the higher limit of the path MTU may not be known when the probing mechanism is started. In other embodiments, the higher limit can be set to an initial value. The probing mechanism is operative to determine or update the higher limit.

In some embodiments, the path MTU parameters may include a next probe value that can be used to determine the size of the next probe packet to be transmitted. For example, the next probe value can be determined by increasing the size of the previously transmitted probe packet by a fixed predetermined value (+1 byte, +2 bytes, etc.). In another example, the next probe value can be determined based on a binary search algorithm that determines the size of the next probe packet based on the higher limit and the lower limit of the search window. For example, the next probe value can equal the halfway point between the lower limit and the higher limit. Other search mechanisms can be used to determine the next probe value without departing from the scope of the present embodiments.

In some embodiments, at operation 401, setting the path MTU search parameters includes setting an initial value for the lower limit and a mechanism for determining the next probe value. In other embodiments, at operation 401, setting the path MTU search parameters includes setting an initial value for the lower limit, a mechanism for determining the next probe value, and an initial value for the higher limit of the search window. In some embodiments, an initial value for the lower limit of the path MTU search window is configurable. The initial value of the lower limit can be set to a path MTU size that is likely to work over a wide range of environments. For example, a value of 1024 bytes can be used as an initial value for the lower limit of the path MTU search window. An initial value selected for the higher limit can be the largest possible packet that might be supported by the flow. For example, the initial value of the higher limit can be limited by a local interface MTU of the ND 110, by an explicit protocol mechanism that specifies the largest amount of data that a network device can receive in a single payload (such as the TCP Maximum Segment Size (MSS), or by an intrinsic limit such as the size of a length field, etc.). In addition, the initial value selected for the higher limit may be limited by an administrator of the system 100 to prevent probing above some maximum size.

In some embodiments, in addition to setting path MTU search parameters, the ND 110 is operative to set an initial path MTU. In some embodiments, during the probing process (i.e., transmission of probe packets to determine the effective MTU of a path between the source ND 110 and the destination ND 120), an initial path MTU can be set and used for transmission of regular traffic. In some embodiments, the size of a probe packet that is to be transmitted is different than the initial path MTU. In other embodiments, the size of the probe packet can be the same as the initial path MTU.

The flow of operations then moves to operation 402. At operation 402, the source ND 110 transmits, towards the destination network device 120, a first outer packet including a first inner packet. For example, the first outer packet is packet 142A including first inner packet 152A. The first outer packet includes a first outer header that is used to transmit the first outer packet to the destination network device, a first outer GRE header, and the first inner packet. The first inner packet includes a first inner header that is used to deliver the first inner packet to the source network device, a first inner GRE header, and a first payload.

In some embodiments, the first payload is selected such that its size is an initial size. For example, the size of the first payload can be set based on the lower limit of the search window. In an initial step, the size of the first payload can be set such that the size of the outer packet equals the lower limit. In another example, the size of the first payload can be determined based on the lower limit and the higher limit of the search window depending on the search algorithm selected. The size of the first payload can be set such that the outer packet 142A has a size that is halfway between the lower limit and the higher limit of the search window. The first payload is generated by the source ND 110. The first payload can include dummy data (e.g., all bits 0s, all bits 1s, mix between 0s and 1s), and/or other information such as timestamps that can be used to measure network round-trip time.

The flow of operations moves to operation 403, at which the source ND 110 monitors receipt of the first inner packet 152A in response to the transmission of the first outer packet 142A. For example, the source ND 110 may start a timer, at operation 404. The timer records the time elapsed since the transmission of the first outer packet 142A. The flow of operation moves to operation 406, at which ND 110 determines whether the inner packet 152A is received before the predetermined period of time has elapsed (i.e., before the expiration of the timer or timeout). The determination of whether the inner packet is received may include the receipt of an inner packet, at operation 408. Alternatively, operation 406 may include the determination that the time period has elapsed without the receipt of an inner packet, at operation 410.

In some embodiments, the source ND 110 receives, at operation 408, the inner packet 152A. The receipt of the inner packet 152A is an indication that the size of the packet 142A is smaller than or equal to the ND MTU of each one of the network devices that are crossed along the path in the network between the source ND 110 and the destination ND 120. As this path may include one or more intermediary network devices 130A-M, each one of these intermediary NDs determines, upon receipt of the first outer packet 142A, how its size compares with its own ND MTU. When the size of the outer packet 142A is smaller than or equal to an ND MTU, the associated ND forwards the outer packet to the next hop towards the destination ND 120. The outer packet 142A is then received by the destination ND 120. Upon receipt of the first outer packet 142A, the destination ND 120 determines whether the size of the first outer packet 142A is smaller than or equal to the ND MTU 121 of the ND 120. In response to determining that the size of the first outer packet 142A is smaller than or equal to the ND MTU 121 of the ND 120, the ND 120 decapsulates the outer packet to retrieve the inner packet 152A. The ND 120 processes the packet according to the GRE protocol and transmits the inner packet 152A towards the source ND 110.

In response to the receipt of the first inner packet, the flow of operations moves to operation 414, at which the source ND 110 updates the path MTU. For example, the source ND 110 may determine that that the effective MTU currently used by the ND 110 for transmitting data along the GRE tunnel 140 is smaller than the size of the outer packet 142A. Upon making this determination, the source ND 110 updates the path MTU to equal the size of the first outer packet 142A. In some embodiments, instead of updating the path MTU for the GRE tunnel 140, the ND 110 may store the size of the outer packet 142A as a size of the last successful probe packet transmitted. This value can be used at a later time to update the path MTU for the GRE tunnel 140 once the probing mechanism is complete. The flow of operations then moves to operation 416, at which the ND 110 updates the path MTU search parameters. For example, the ND 110 may update the value of the lower limit of the search window to equal the size of the first outer packet. The ND 110 may further determine the next probe value indicating the size of the next probe packet that is to be transmitted by the ND 110. The operations 402, 403 are then repeated until by having the ND 110 transmitting updated probe packets (e.g., packets from 142A-N) with varying sizes. These packets are generated based on varying sizes of payload set according to a searching mechanisms that define the next probe value for each iteration. The operations are repeated until a determination that no inner packet is received before the predetermined period of time elapses at operation 406.

Referring back to operation 406, the ND 110 may determine, at operation 410, that the time period has elapsed without receipt of an inner packet for the transmitted packet. In one example, an inner packet is not received as a result of congestion along the path between the source ND 110 and the destination ND 120. In another example, inner packet may not be received as it is dropped by a network device along the path for having a size that is greater than the ND MTU of the network device. Referring to the example of FIG. 1, following the transmission of several outer packets 142A-L, and receiving associated inner packets 152A-L, ND 110 may transmit outer packet 142N. The outer packet 142N crosses one or more intermediary network devices such as intermediary ND 130A-M. In one example, the size of the outer packet 142N is greater than the ND MTU of ND 130A. Upon receipt of the second outer packet 142N, the intermediary ND 130A determines that the size of the second outer packet is greater that its associated ND MTU 131A and drops the outer packet 142N as a result of this determination. While the example is described with intermediary ND 130A dropping the packet 142N, this may occur at any one of the intermediary NDs 130B-N or at the destination ND 120. As the outer packet is dropped, the intermediary ND 130B does not process the packet and the destination ND 120 does not receive the outer packet 142N and cannot transmit the inner packet 152N. The source ND 110 does not receive the second inner packet 152N in response to the transmission of the outer packet 142N. In another example, the ND 110 may not receive the inner packet 152N either because the packet 142N is dropped or the inner packet 152N is dropped for another reason that the ND MTU (e.g., either one of the packets can be dropped as a result of congestion in the network).

The source ND 110 determines that the inner packet is not received before the predetermined period of time elapses. For example, the determination that the inner packet is not received is performed as a result of expiration of the timer started upon transmission of the outer packet 142N from the ND 110, at operation 404. Responsive determining that the inner packet is not received before a predetermined period of time has elapsed, the flow of operations moves to operation 418. At operation 418, the ND 110 increments a counter associated with the path from the source ND 110 to the destination ND 120. The flow of operations moves to operation 420, at which the ND 110 determines whether the counter value is greater than a predetermined threshold.

When it is determined that the value of the counter is not greater than the predetermined threshold, the ND 110 repeats operation 402 and 403. The operations are repeated based on the same outer packet 142N. The same outer packet 142N is retransmitted until it is determined that the value of the counter is greater than the threshold, at operation 420, or the receipt of the inner packet. For example, when in the inner packet is not received back by the ND 110 as a result of congestion in the network, the retransmission of the outer packet 142N may allow the ND 110 to receive the inner packet, when the congestion is resolved. Alternatively, when the inner packet is not received back by the ND 110 as a result of its size being greater than the ND MTU of a network device along the path, it is likely that all successive transmissions of the packet will have the same results consequently increasing the value of the counter at operation 420. When the counter value is greater than the predetermined threshold, it is an indication that a number of packets of the same size (e.g., size of packet 142N) have been successively transmitted by the ND 110 without receipt of their corresponding inner packets.

Following the increase of the counter value several times until the value of the counter reaches the threshold, the flow of operations move to operation 422. At operation 422, the network device 110 determines that the higher limit of the path MTU search window has been reached. When the higher limit of the search window is reached, it is an indication that the size of the packet 142N is greater than an effective path MTU of the path from the network device 110 to the network device 120 and that the path MTU at the ND 110 should be set to be smaller than the size of the packet 142N. In some embodiments, when the higher limit of the path MTU search window is reached, the proving process may stop at operation 424. In these embodiments, the path MTU has previously been set to the last size of probe packets that successfully crossed the network and returned an inner packet. In other embodiments, when the size of the last successful probe packets is stored without updating the path MTU during the probing process, the flow of operations moves to operation 414, at which the path MTU of the ND 110 is updated to equal the size of the last successful probe packet. For example, the path MTU can be set to the size of the outer packet 142L, which is successfully processed (i.e., its inner packet 152L is received back from the ND 120).

In some embodiments, the probing process can be repeated periodically to determine whether the path MTU for the path between the endpoints of the GRE tunnel 140 has changed. For example, the mechanisms of FIG. 4 can be repeated based on updated initial search parameters to determine whether the path MTU has increased or decreased.

Figure 5:
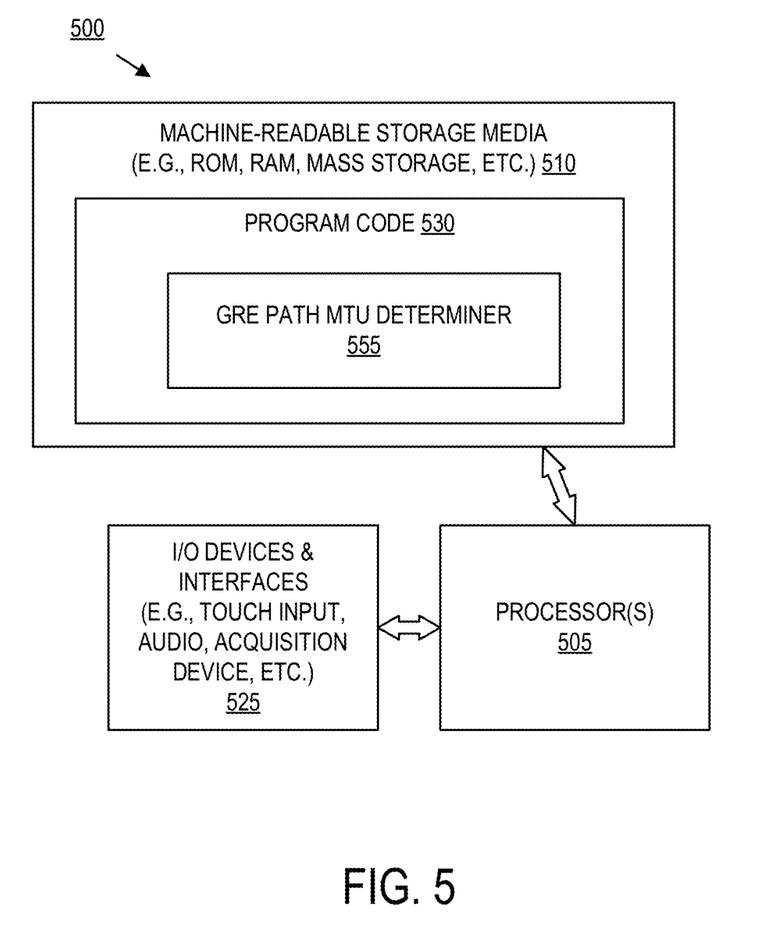
FIG. 5 illustrates a block diagram for an exemplary data processing system that may be used in some embodiments.

FIG. 5 illustrates a block diagram for an exemplary data processing system 500 that may be used in some embodiments. Data processing system 500 includes one or more processors 505 and connected system components (e.g., multiple connected chips). One or more such data processing systems 500 may be utilized to implement the embodiments and operations described with respect to the network devices or other electronic device.

The data processing system 500 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 510 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 505. For example, the depicted machine-readable storage media 510 may store program code 530 that, when executed by the processor(s) 505, causes the data processing system 500 to execute the GRE path MTU determiner 555.

The data processing system 500 also includes one or more input or output ("I/O") devices and interfaces 525, which are provided to allow a user to provide input to, receive output from, and otherwise transfer data to and from the system. These I/O devices 525 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 525 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 500 with another device, external component, or a network and receive stored instructions, data, tokens, etc. For instance, a wired or wireless transceiver may transmit and receive messages to and from the network devices as described herein.

Additional components, not shown, may also be part of the system 500, and, in certain embodiments, fewer components than that shown in FIG. 5 may also be used in a data processing system 500. One or more buses may be used to interconnect the various components shown in FIG. 5.

Thus, an electronic device (e.g., a computer or a mobile client device) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, compute server, DNS server, control server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a source network device that is a first endpoint of a Generic Routing Encapsulation (GRE) tunnel, the method comprising:
    transmitting, to a destination network device that is a second endpoint of the GRE tunnel, a first GRE encapsulated packet that includes a first inner packet that includes a first inner header that is used to deliver the first inner packet to the source network device and a first payload;
    receiving, at the source network device, the first inner packet from the destination network device;
    transmitting, to the destination network device, a second GRE encapsulated packet that includes a second inner packet that includes a second inner header that is used to deliver the second inner packet to the source network device and a second payload that has a size that is greater than a size of the first payload;
    determining that the second inner packet is not received at the source network device before a predetermined period of time has elapsed; and
    determining a path maximum transmission unit (MTU) for a path between the source network device and the destination network device based on a size of the first GRE encapsulated packet and the second GRE encapsulated packet.

2. The method of claim 1 further comprising:
    responsive to determining that the second inner packet is not received before the predetermined period of time has elapsed, retransmitting the second GRE encapsulated packet to the destination network device a number of times.

3. A source network device that is a first endpoint of a Generic Routing Encapsulation (GRE) tunnel, the source network device comprising:
    one or more processors; and
    a non-transitory machine-readable storage media coupled with the one or more processors that store instructions that, when executed by the one or more processors, cause the source network device to perform operations including:
        transmit, to a destination network device that is a second endpoint of the GRE tunnel, a first GRE encapsulated packet that includes a first inner packet that includes a first inner header that is used to deliver the first inner packet to the source network device and a first payload;
        receive, at the source network device, the first inner packet from the destination network device;
        transmit, to the destination network device, a second GRE encapsulated packet that includes a second inner packet that includes a second inner header that is used to deliver the second inner packet to the source network device and a second payload that has a size that is greater than a size of the first payload;
        determine that the second inner packet is not received at the source network device before a predetermined period of time has elapsed; and
        determine a path maximum transmission unit (MTU) for a path between the source network device and the destination network device based on a size of the first GRE encapsulated packet and the second GRE encapsulated packet.

4. The source network device of claim 3, wherein the operations further include:
responsive to determining that the second inner packet is not received before the predetermined period of time has elapsed, retransmit the second GRE encapsulated packet to the destination network device a number of times.

5. A non-transitory computer readable storage medium that stores instructions which when executed by one or more processors of a source network device that is a first endpoint of a Generic Routing Encapsulation (GRE) tunnel cause the source network device to perform operations including:
transmitting, to a destination network device that is a second endpoint of the GRE tunnel, a first GRE encapsulated packet that includes a first inner packet that includes a first inner header that is used to deliver the first inner packet to the source network device and a first payload;
receiving, at the source network device, the first inner packet from the destination network device;
transmitting, to the destination network device, a second GRE encapsulated packet that includes a second inner packet that includes a second inner header that is used to deliver the second inner packet to the source network device and a second payload that has a size that is greater than a size of the first payload;
determining that the second inner packet is not received at the source network device before a predetermined period of time has elapsed; and
determining a path maximum transmission unit (MTU) for a path between the source network device and the destination network device based on a size of the first GRE encapsulated packet and the second GRE encapsulated packet.

6. The non-transitory computer readable storage medium of claim 5, wherein the operations further comprise:
responsive to determining that the second inner packet is not received before the predetermined period of time has elapsed, retransmitting the second GRE encapsulated packet to the destination network device a number of times.

7. The method of claim 1, wherein the path MTU is set to be no greater than a size of the first GRE encapsulated packet.

8. The method of claim 1, wherein the path MTU is set to be less than a size of the second GRE encapsulated packet.

9. The method of claim 1, wherein the first GRE encapsulated packet and the second GRE encapsulated packet are each of a size that is expected to be able to be delivered to the destination network device.

10. The method of claim 1, wherein the second GRE encapsulated packet is of a size is not greater than a TCP maximum segment size (MSS).

11. The source network device of claim 3, wherein the path MTU is set to be no greater than a size of the first GRE encapsulated packet.

12. The source network device of claim 3, wherein the path MTU is set to be less than a size of the second GRE encapsulated packet.

13. The source network device of claim 3, wherein the first GRE encapsulated packet and the second GRE encapsulated packet are each of a size that is expected to be able to be delivered to the destination network device.

14. The source network device of claim 3, wherein the second GRE encapsulated packet is of a size is not greater than a TCP maximum segment size (MSS).

15. The non-transitory computer readable storage medium of claim 5, wherein the path MTU is set to be no greater than a size of the first GRE encapsulated packet.

16. The non-transitory computer readable storage medium of claim 5, wherein the path MTU is set to be less than a size of the second GRE encapsulated packet.

17. The non-transitory computer readable storage medium of claim 5, wherein the first GRE encapsulated packet and the second GRE encapsulated packet are each of a size that is expected to be able to be delivered to the destination network device.

18. The non-transitory computer readable storage medium of claim 5, wherein the second GRE encapsulated packet is of a size is not greater than a TCP maximum segment size (MSS).

* * * * *